(12) United States Patent
Lake et al.

(10) Patent No.: US 9,187,512 B2
(45) Date of Patent: *Nov. 17, 2015

(54) PROCESS FOR TREATING LIGNIN

(76) Inventors: Michael A. Lake, Mt. Pleasant, SC (US); John C. Blackburn, Easley, SC (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/118,745

(22) PCT Filed: Mar. 29, 2012

(86) PCT No.: PCT/US2012/031085
§ 371 (c)(1),
(2), (4) Date: Feb. 20, 2014

(87) PCT Pub. No.: WO2012/161865
PCT Pub. Date: Nov. 29, 2012

(65) Prior Publication Data
US 2014/0200334 A1    Jul. 17, 2014

Related U.S. Application Data

(60) Provisional application No. 61/489,390, filed on May 24, 2011, provisional application No. 61/499,920, filed on Jun. 22, 2011.

(51) Int. Cl.
| C07G 1/00 | (2011.01) |
| D21C 11/00 | (2006.01) |
| D21C 11/04 | (2006.01) |
| C02F 103/28 | (2006.01) |

(52) U.S. Cl.
CPC .............. *C07G 1/00* (2013.01); *D21C 11/0007* (2013.01); *D21C 11/04* (2013.01); *C02F 2103/28* (2013.01)

(58) Field of Classification Search
CPC ............................... C07G 1/00; D21C 11/0007
See application file for complete search history.

(56) References Cited

U.S. PATENT DOCUMENTS

| 4,111,928 A * | 9/1978 | Holsopple et al. ............ 530/507 |
| 4,797,157 A * | 1/1989 | Dilling et al. .............. 106/31.43 |
| 4,891,070 A * | 1/1990 | Dilling et al. .............. 106/31.75 |
| 5,773,590 A * | 6/1998 | Hart .............................. 530/500 |
| 5,777,086 A * | 7/1998 | Klyosov et al. ............... 530/500 |
| 2002/0129910 A1* | 9/2002 | Lightner ......................... 162/16 |
| 2008/0047674 A1* | 2/2008 | Ohman et al. ................. 162/16 |
| 2008/0051566 A1* | 2/2008 | Ohman et al. ................ 530/500 |
| 2010/0041879 A1* | 2/2010 | Stigsson et al. ............... 536/127 |
| 2010/0325947 A1* | 12/2010 | Ohman et al. ................. 44/606 |
| 2011/0294991 A1* | 12/2011 | Lake et al. .................... 530/500 |
| 2014/0121359 A1* | 5/2014 | Thies et al. ................... 530/500 |
| 2014/0163245 A1* | 6/2014 | Lake et al. .................... 549/489 |

FOREIGN PATENT DOCUMENTS

WO    2011037967 A2    3/2011

OTHER PUBLICATIONS

International Search Report for PCT/US2012/031085, dated Oct. 30, 2012.

* cited by examiner

*Primary Examiner* — Liam J Heincer
(74) *Attorney, Agent, or Firm* — Ernest B. Lipscomb; Barnwell Whaley Patterson & Helms

(57) ABSTRACT

A process for recovery of lignin from black liquor that contains either soluble or dispersed lignin by generating a "liquid lignin" at high yield is disclosed. Soluble lignin at a high pH is precipitated by reducing the pH of the black liquor stream by countercurrent reaction with carbon dioxide, at elevated temperature and pressure, creating a heavy lignin-rich phase and a light lignin-depleted phase. The heavy lignin-rich phase is separated and washed countercurrently with a non-sulfur containing acid, such as acetic acid, to displace metal cations from the lignin, creating a low-salt lignin, which is then formed into a low-dust, high-bulk density lignin fuel pellet. If desired, an oxidation step may be used to eliminate odor for lignins having high value green chemistry applications.

18 Claims, 3 Drawing Sheets

PROCESS FOR TREATING LIGNIN

CROSS-REFERENCE TO RELATED APPLICATION(S)

The contents of Provisional Application U.S. Ser. No. 61/489,390 filed May 24, 2011 and Provisional Application U.S. Ser. No. 61/499,920 filed Jun. 22, 2011, on which the present application is based and benefits claimed under 35 U.S.C. §119(e), is herein incorporated by reference.

BACKGROUND OF THE INVENTION

1. Field of the Invention

The present invention relates to processes for recovering lignin from black liquor within a papermaking operation or a crude lignin waste stream from a biomass enzymatic conversion process. More particularly, the present invention relates to processes for recovering and purifying lignin to produce a low-salt, low-sulfur, high-energy-content lignin product.

2. The Prior Art

Lignin, a component of wood, is the second most abundant polymer in the world behind cellulose. Lignin is primarily recovered from the black liquor stream within pulp and paper mills, such as from the kraft or soda pulping process. Black liquor is removed from the host paper mill's recovery system downstream of an efficiently-performing soap separator, since tall oil impurities are deleterious to the operation of the unit operations of the process and the downstream applications, especially the high-value applications other than fuel pellets. Additionally, crude lignin is a byproduct stream from the plethora of technologies using enzymes being developed which convert the cellulose in biomass to ethanol or other products. Those enzymes do not affect lignin which exits those processes in various forms, generally low in solids and with various pHs depending on upstream treatments.

With its high energy density and variety of functional groups and structure, lignin holds promise to be an efficient biofuel source or green-chemical precursor. Thus, one use for lignin is to recover lignin as a solid and burn the solid lignin as a fuel, to or use the lignin as a binder for energy pellets. Another use is to provide a process to recover a high-purity low-salt lignin that is used to replace phenol used in resins for composites, to be a natural polymer for making polyurethanes, or to be used in a wide variety of alternative downstream chemical applications.

The shortcoming with the current art is the sulfur content of the lignin and related chemical process streams. Additional opportunities exist for a sulfur-free system beginning with crude lignin from a soda pulping process or crude lignin stream from a chemical biomass process. An alternative acidification system enables the integration of a lignin recovery and purification process into a soda pulping process where sulfur chemicals cannot be used.

Currently wood pellets are burned, but the ash content and lower energy density limit their use as a fuel. Lignin pellets have approximately the same energy content as coal, about 12,000 Btu/lb, which is about 50% higher energy per mass of low-moisture wood pellets having about 8,000 Btu/lb. Lignin pellets may be used alone or blended directly with the coal feed with the only additional capital being the separate storage and feeding equipment for the pellets. Also lignin has demonstrated potential as an improved binder for wood or grass pellets, decreasing the dust levels generated in processing of the pellets, improving the water resistance of pellets which is important for outside storage of pellets, and increasing the energy density of the pellets.

Two lignin recovery methods from papermaking black liquor are presently used. The first method, implemented in the 1940s adjacent to a host kraft mill in Charleston S.C., makes powdered lignin containing a high-salt content, which is difficult for power companies to handle. The salt content also creates issues with high ash within power furnaces. Also there is the problem of cooling and diluting the black liquor that is returned to the host paper mills, which creates a high energy penalty in the black liquor recovery operation. The second method, in development since the 1990s, is currently run as a demonstration plant in Sweden. This second method makes low-salt lignin pellets used for fuel, but major issues exist with high wash-water and energy penalty suffered by the host paper mills. The filtrates from the second method have to be returned to the host paper mill to recover the sodium but the black liquor is cooled significantly (from >200° F. to <140° F.) in addition to the wash water, which is added.

Removing a fraction (up to 30%) of the lignin from black liquor allows pulp and paper mills that have reached the maximum throughput of their recovery boilers to increase production by the same fraction of lignin removed. For example, a large paper mill recovering 30% of their lignin from black liquor could produce >50,000 tons of lignin pellets per year. If a papermaking facility makes 50,000 ton/yr of lignin, and that lignin energy value is replaced by burning residual wood, then that lignin is used to displace coal, then the overall green-house gases are reduced by 250,000 ton/yr.

Most pulp and paper mills have the infrastructure to gather residual wood within an economically-effective radius (~70 miles) of the mill. Many of these mills have reached the limit of their recovery furnaces because of heat-transfer limitations within the furnace. The multiple tubes within the furnace that generate steam on the inside with heat transferred from the burning concentrated black liquor on the outside reach their upper limit of heat flux. Increasing that heat flux risks catastrophic consequences (recovery furnace explosions); thus mills don't exceed that limit. Removing a fraction (≤30%) of the lignin allows the mills to increase their overall production rate of paper by that same fraction.

Many states are implementing renewable energy thresholds on electricity-generating power furnaces, many of which burn coal. However, burning significant fractions of residual wood, as the paper industry does, requires a different design of the furnace, which would have a larger footprint and would require more capital than a coal-burning furnace. A major factor is the lower energy content of residual wood containing significant levels of water (≥40%); wet residual wood has as low as 25% the energy density (Btu/lb) as coal or lignin pellets. To produce energy pellets, the wood has to be dried to moisture contents of 10-20%, but the energy density of cellulose is still ⅔ that of coal. And residual wood contains significant levels of inorganics, which result in much higher levels of ash within the fuel, which requires either specialized equipment to continuously remove the ash or periodic shutdown to remove the ash. The paper industry historically has built power furnaces capable of burning large fractions of residual wood; the power industry has not. The power industry can add small fractions of residual wood to their furnaces, but a practical upper limit is soon reached. Additionally the power industry and paper industry are frequently at odds, competing for the same supply of residual wood.

SUMMARY OF THE INVENTION

In accordance with the present invention there are provided processes for recovering lignin from black liquor to form a liquid-lignin phase, purifying the lignin to requisite low-ash levels, and producing a lignin particle. Further, the process provides for producing a lignin pellet to replace coal in existing power furnaces. Alternatively, lignin in the form of randomly-shaped particles exits one of the embodiments of the process, saving the cost of extruder operation. The randomly-shaped particles or pellets of lignin may be used as an improved binder for the biomass-based energy pellet market.

The present invention provides processes for recovering a liquid lignin from a lignin containing stream such as a black liquor stream from a paper making process or the crude lignin stream within an enzymatic biomass conversion process by carbonating, acidifying with a non-sulfur containing acid, such as acetic acid, and recovering the liquid lignin. More specifically, the process may comprise as an optional first step, pressurizing black liquor to between 50 and 200 psig. As an optional step, sufficient oxygen may be reacted with the black liquor to reduce and/or eliminate odors. The soluble lignin at a pH between 12 and 14 is precipitated by introducing the black liquor, either pressurized or not, into an absorption column and treating the black liquor, which is at an elevated temperature and pressure, countercurrently with carbon dioxide ($CO_2$), to reduce the pH below pH 11, preferably to between about 9 and 10 to partially neutralize the NaOH and other basic components within the black liquor. The carbon dioxide also converts much of the sodium (and other metals) phenolic groups on the lignin molecules to the hydrogen form, causing the lignin to become insoluble. The carbonated black liquor and lignin undergo a phase separation creating a dense lignin-rich "liquid-lignin" phase and a light lignin-depleted phase. The light lignin-depleted phase, being mostly black liquor, is returned to the recovery process of the host paper mill at a temperature higher than the temperature of the black liquor received, thus, removing a major impediment for commercial implementation by paper mills.

The dense lignin-rich phase is washed countercurrently with a sulfur-free acid, such as acetic acid, to displace remaining sodium ions from the lignin and further acidify the residual NaOH, other basic components, and the residual $NaHCO_3$ salt formed in the carbonation column, creating a low-salt lignin at a pH less than 4. The low-salt lignin is extracted or washed with water to remove the residual acid and inorganic salts and then used as is or is pelletized to form a low-dust, high-bulk-density lignin fuel.

An alternative is to take the dense liquid-lignin phase directly into another pressurized reactor where the stream is mixed with a sulfur-free acid. Depending on the nature of the lignin and the temperature of the reactor, the lignin forms either another dense liquid lignin phase or heavy solid granules that separate by settling. Either of these lignin forms can be pumped or discharged through a pressure-reducing valve into a countercurrent water extraction system, where residual acid and salt are removed, creating a low-ash lignin.

In either alternative, the off-gases from the acidification reaction will be rich in $CO_2$ from the reversal of the sodium bicarbonate contained within the heavy liquid-lignin phase formed in the carbonation system. Since this is a continuous process, this $CO_2$-rich vent stream can be recycled to the carbonation system, reducing the overall process requirement of $CO_2$.

Being a countercurrent continuous washing or extraction system, the minimum levels of water will be required to achieve the target ash level in the final product. Also a portion of the extraction or wash water can be recycled to the acidification reactor to reduce the process water requirements of the process.

It is therefore the general object of the present invention to provide a novel process for recovering and purifying lignin to produce a low-salt, high-energy-content lignin pellet, especially useful as a fuel.

Another object of the present invention is to provide a process that is suitable for high-value green-chemistry applications such as replacing phenol in resins, providing a base polymer for polyurethanes, and other end-use applications where the chemical functionalities of lignin are employed.

Other object features and advantages of the invention will be apparent to those skilled in the art from the following detailed description taken in conjunction with the drawings.

BRIEF DESCRIPTION OF THE DRAWINGS

Having described the invention in general terms, reference will now be made to the accompanying drawings, which are not necessarily drawn to scale, and wherein.

DESCRIPTION OF THE PREFERRED EMBODIMENT(S)

The present invention now will be described more fully hereinafter with reference to the accompanying drawings, in which preferred embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. Like numbers refer to the elements throughout.

Figure 1:
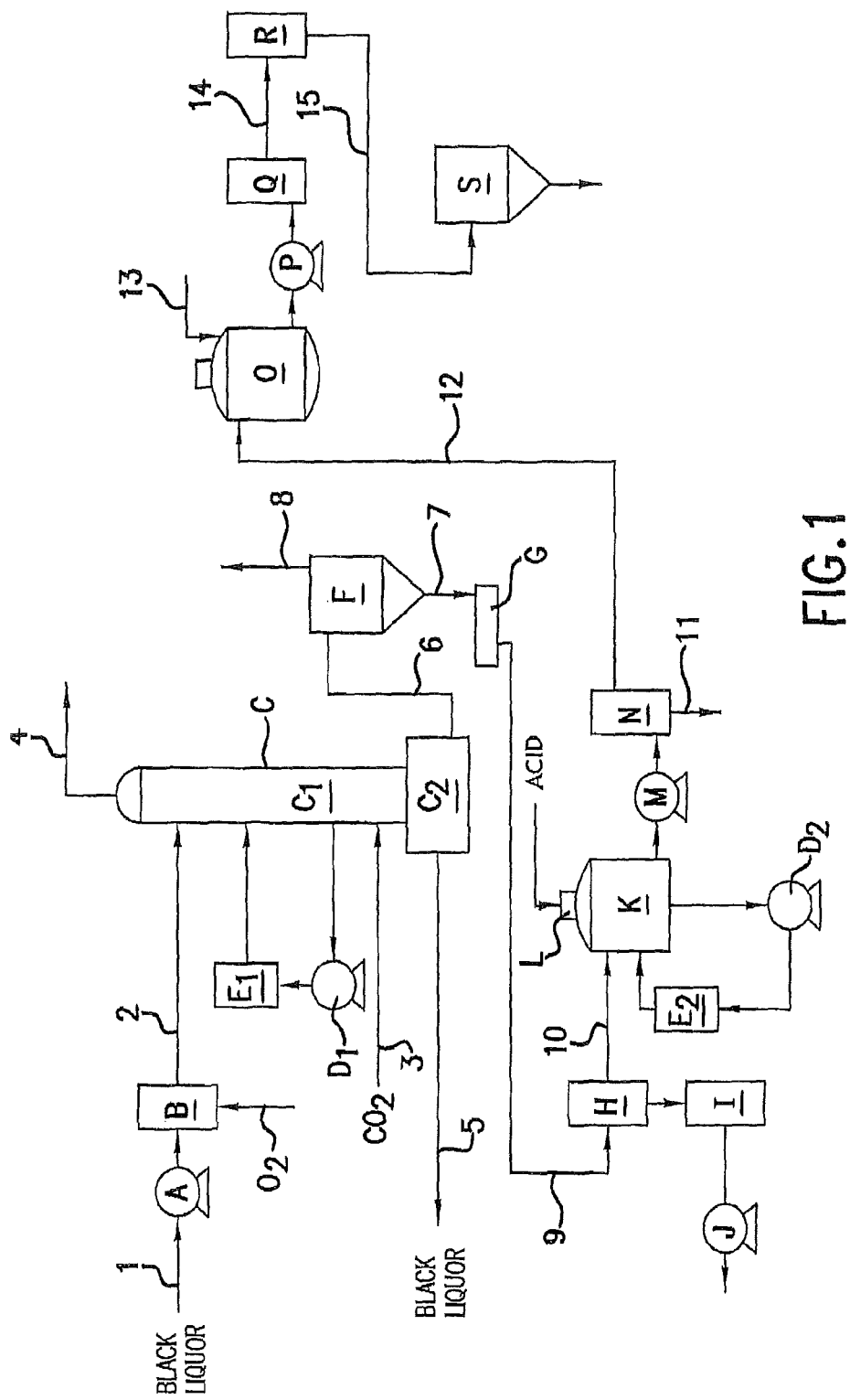
FIG. 1 is a schematic flow diagram which illustrates an embodiment of the process of the present invention showing the optional oxygenating step, the carbonating step, the acidifying step and the extracting step.

Referring to FIG. 1, there is shown a schematic diagram of an embodiment of a process of the present invention showing the steps, from a lignin containing stream, of carbonating to form a liquid-lignin, acidifying and recovering liquid-lignin. Black liquor, leaving the soap separator in the pulp and paper plant, is introduced through line 1 to pump A where the black liquor is preferably pressurized to between about 50 psig to about 200 psig, preferably about 150 psig. Typically the black liquor is removed midway in the evaporator train, preferably at a solids content of 30% to 45% and has a temperature of about 80° C. to about 120° C. Keeping the heat of reaction in the pressurized system raises the temperature significantly. It should be understood that the solids content of the black liquor ranges from about 10% to about 70%, but more normally is from 25% to 60%. The melt point of lignin depends strongly on the level of sodium ions, the source of the lignin, and the level of occluded black liquor in the lignin phase, hence its viscosity is difficult to predict. Alternatively, the black liquor may be taken downstream from the tall soap separator.

Figure 2:
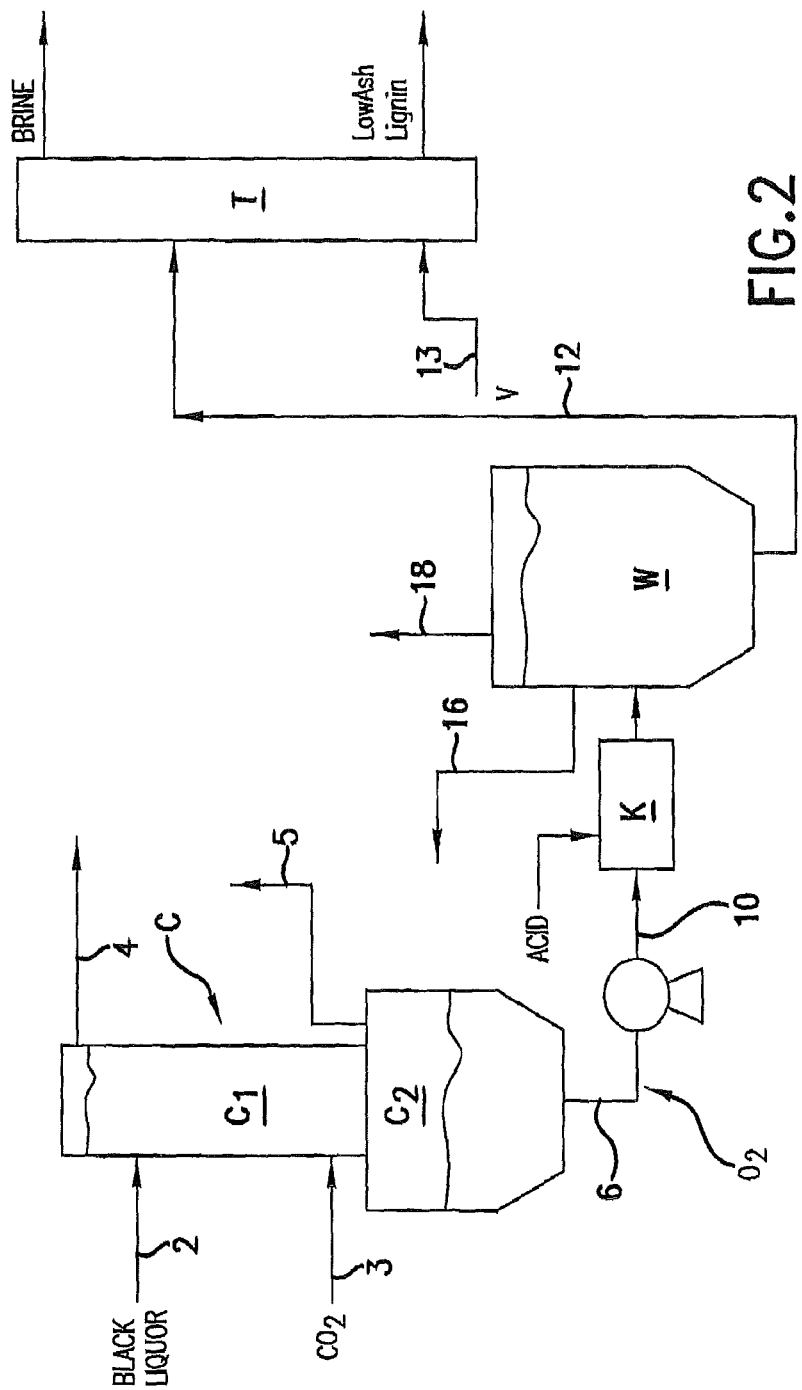
FIG. 2 is a schematic diagram of an alternative embodiment of the process of the present invention showing the application of oxygenating after the carbonating step.

Also, as an option, the pressurized black liquor may be reacted with an oxidizing agent, such as oxygen, peroxide or the like, in an amount sufficient to reduce or eliminate the odor level in the black liquor so that there will be little or no odor in the final lignin product. Only the odorous materials are intended to be oxygenated, not the lignin material. This step removes the odor, by reacting with the mercaptans (methyl, ethyl, dimethyl, and diethyl) and other malodorous components. Preferred equipment for this reaction is a Hydrodynamics Shockwave Power Reactor®, shown at B in FIG. 1. The oxygenation also has a substantial heat of reaction, raising the temperature of the stream about 50° C. depending on the reactants within the aqueous stream and its solids content. An alternative location in the process, that shown in FIG. 2, is to oxidize the liquid lignin exiting the carbonation column $C_2$ in line 6, and thereby conserving oxygen by not oxidizing the entire black liquor flow. Another alternative is to not oxidize the black liquor when applications are insensitive to the odor of the final product, as typically would be the case when the lignin is to be used as a fuel or as a binder for energy pellets.

Lignin begins to precipitate near the black liquor entrance at the top of the column as the pH begins to be reduced by carbon dioxide. As the pH decreases from its high (12-14) near the top to the exit at the bottom at a pH below 11, preferably between a pH of from pH 9 to pH 10, more and more lignin becomes insoluble and coalesces within column. Countercurrently contacting the incoming black liquor with $CO_2$, creates a pH gradient in a column so that liquid-lignin droplets are created near the top that sweep and collect other liquid-lignin droplets that are forming at the lower pH in the lower zone of the column. The liquid-lignin particles have a natural affinity for other liquid-lignin particles, facilitating coalescence as they fall within the column. As the liquid-lignin particles fall through the column, they collect other particles that are forming at the lower pH within the lower zones of the column. The dense particles then coalesce into a bulk liquid-lignin phase which accumulates at the bottom of the column.

Pressurized black liquor is introduced via line 2 into the top of a two part carbonation absorption column C and $CO_2$ is introduced via line 3. The size of the column will depend upon the volume of black liquor being treated. For example, in a column designed to process 50,000 tons of lignin per year, the upper portion of the column $C_1$ may be approximately 6' diameter, 40' tall. The black liquor, with a high NaOH content and a pH of near 14, reacts with the $CO_2$ to form $NaHCO_3$. The column may operate at a nominal pressure of 150 psig and a temperature between about 80° C. and 200° C., preferably about 100° C. to 150° C. In the column, the NaOH is neutralized, lowering the pH to less than pH 11, preferably pH 8 to 11, more preferably from pH 9 to pH 10. This reaction causes the release of a substantial exotherm, increasing the temperature of the stream depending on the NaOH content and the solids level of the stream. Malodorous gases leave the top of column $C_1$ via line 4 and are vented to a vapor control system. When the option of oxygenating is used, the combined temperature rise of oxygenated and carbonated black liquor is typically about 20° C. or more.

The black liquor and lignin solution pass into the bottom portion of the carbonation absorption column $C_2$, where the lignin undergoes phase separation, forming a heavy liquid lignin phase. The high temperature and pressure separation preserve heat from the heats of reaction of the sequential reaction of $O_2$, and lignin, when the oxygenating step is used, and $CO_2$ and lignin that enables the process to send that heat back to the recovery operation in the black liquor via line 5. The lower portion $C_2$ of the $CO_2$ column is larger than the upper portion. For example, the lower portion may be approximately 10' in diameter and 15' tall for a 50,000 ton per year column. The carbon dioxide also converts much of the sodium (and other metals) and phenolic groups on the lignin molecules to the hydrogen form, causing the lignin to become insoluble. The carbonated black liquor and lignin undergo a phase separation creating a dense lignin-rich "liquid lignin" phase and a light lignin-depleted phase. The black liquor separates into the light (top) phase and is returned to the recovery operation of the host paper mill via line 5. The dense liquid-lignin phase leaves the bottom of the column $C_2$ via line 6.

A safety re-circulating loop is provided within column $C_1$ to remove excess heat if needed. The loop includes pump $D_1$ and heat exchanger $E_1$. Alternatively, the temperature within the column can be controlled with a heat exchanger on the inlet black liquor line, controlling the temperature within the column to provide optimum separation.

The lignin solution leaving the bottom of $C_2$ via line 6 contains approximately 30-40% aqueous phase and goes to a tangential entry cyclonic flash tank F. In the flash tank F, the liquid-lignin solution is flashed down to atmospheric pressure with the evolution of steam which is vented to the atmosphere through line 8. Typically, about 85% of the aqueous phase is removed in this step. The relatively dry lignin solution from flash tank F passes through line 7 into an attrition unit G, such as a screw conveyor, which pulverizes the lignin into a smaller size range. The lignin particles are passed via line 9 to belt filter H. The lignin particles remain large enough not to slow the filtration. The belt filter H separates out any residual black liquor occluded inside the lignin particles that was not previously removed. The residual black liquor is returned to the pulp mill via a pump tank I followed by intermittent service transfer pump J.

The lignin is then transferred via line 10, preferably by a screw conveyor from the belt filter outfall to a mix tank K where the lignin is washed with a sulfur-free acid, such as acetic acid, to neutralize the residual NaOH. During this step the pH is reduced to a pH less than 4, preferably from about 1.5 to about 3.5. An agitator L provides a high level of mixing within a short residence time. The acidified lignin slurry is then pumped M to drum filter N, where the lignin is separated from the acid water, which is removed through line 11. The acidifying step is carried out at a temperature up to 200° C. to form a dense liquid-lignin phase. When the acidifying temperature is between about 90° C. and about 130° C. lignin granules are formed. When the acidifying step is carried out at a temperature above about 130° C. a dense taffy-like lignin is formed. These temperatures are dependent upon the specific nature of the lignin.

Either of these lignin forms can be pumped or discharged through a pressure-reducing valve into a countercurrent water extraction system, where residual acid and salt are removed, creating a low-ash lignin. For example, from the filter N, the lignin filter cake is passed through line 12, preferably via a screw conveyor to a second agitated mix tank O. Water is fed to the mix tank via line 13 for thorough removal of acid. A centrifugal pump P is used to pump the wet lignin to another filter Q, where it may be recovered and used as is.

Alternatively, the dried lignin is then conveyed through line 14, preferably via a screw conveyor, to a pelletizer R, where the lignin is pelletized. The pellets are then transferred to pellet storage bin S using line 15. The dried lignin has an ash content less than 1.0%, preferably less than 0.1%.

In an alternative of the processes of this invention, black liquor is passed through line 2 to the two part absorption column C where it is treated countercurrently with $CO_2$ to lower the pH. In the embodiment shown in FIG. 2 the liquid lignin leaves the bottom portion $C_2$ of the $CO_2$ column through line 6 where it is oxygenated. The oxygenated liquid-lignin phase is pumped through line 10 into another pressurized mixer K where the stream is mixed with a sulfur-free acid. Depending on the nature of the lignin and the temperature of the reactor, the lignin forms either another dense liquid-lignin phase or heavy solid granules that separate by settling, such as in settling tank W. A stream of acid brine is removed through line 16 and a stream of off-gases including malodorous gases and carbon dioxide is removed through vent line 18. The dense liquid-lignin is passed through line 12 to an extraction column T where water through line 13 is fed countercurrently through the column. Being a countercurrent continuous washing or extraction system, the minimum levels of water will be required to achieve the target ash level in the final product. Also a portion of the extraction or wash water can be recycled to the acidification reactor to reduce the process water requirements of the process. A low ash lignin is removed from the bottom of the column and brine is removed from the top.

Figure 3:
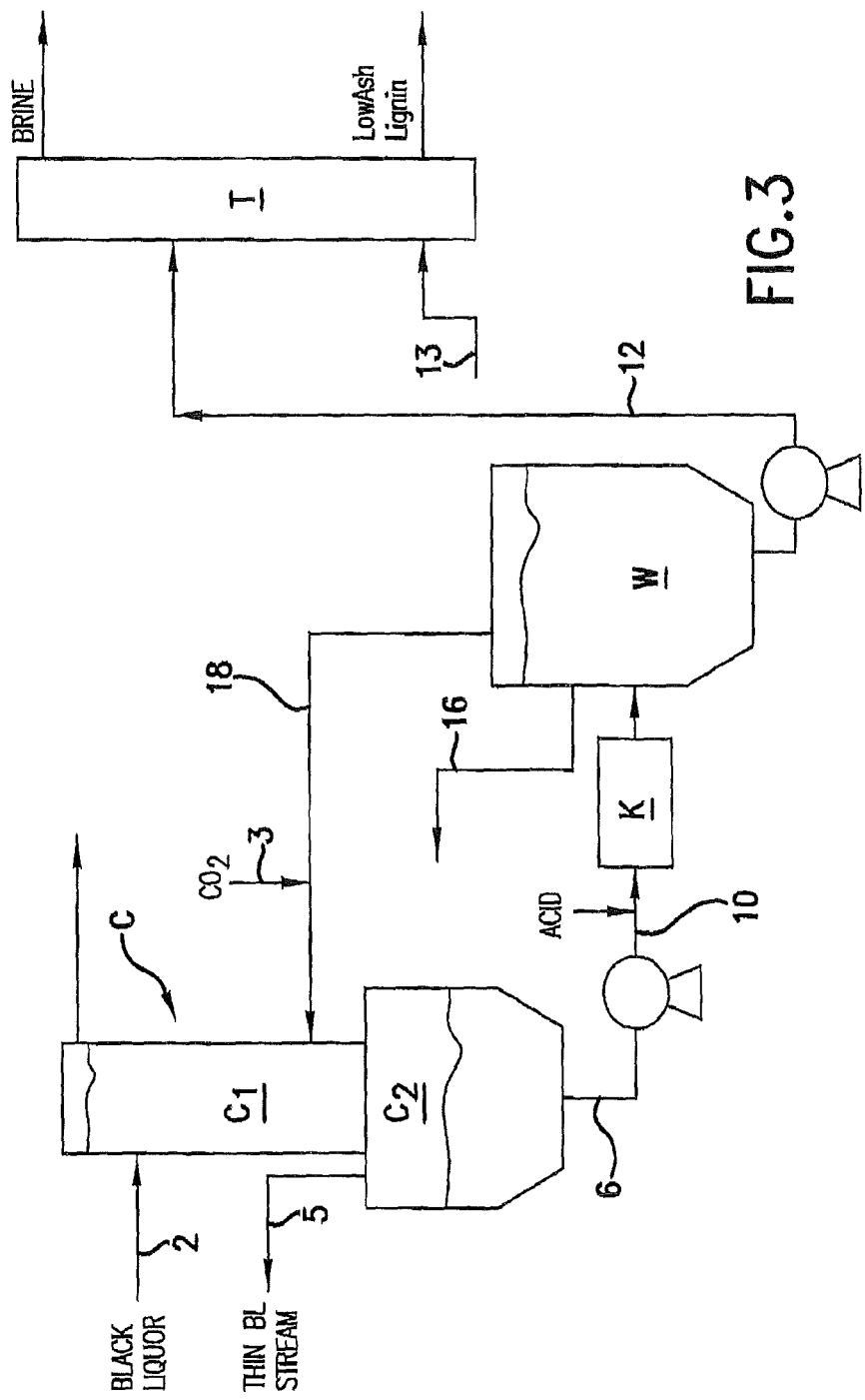
FIG. 3 is a schematic diagram of an alternative embodiment of the process of the present invention showing recycle of carbon dioxide from the acidification settling tank to the carbonation column.

In FIG. 3 there is shown a variation of the processes shown in FIG. 1 and FIG. 2. In either process, the off-gases from the acidification reaction K will be rich in $CO_2$ from the reversal of the sodium bicarbonate contained within the heavy liquid-lignin phase formed in the carbonation system. Since this is a continuous process, this $CO_2$-rich vent stream 18 can be recycled to the carbonation column C, reducing the overall process requirement of $CO_2$. Additional $CO_2$ is added through line 3.

EXAMPLE 1

Black liquor was oxidized using the Shockwave Power Reactor (SPR Hydrodynamics, Rome, Ga.). A single-pass and a two-pass operation were run on each of the two kraft papermaking black liquors. Data from the runs are shown in Table 1. The two-pass oxidized black liquor samples were used for the following examples.

|  | Black Liquor A at 38% solids | | Black Liquor B at 48% solids | |
| --- | --- | --- | --- | --- |
|  | $1^{st}$ Pass on SPR | $2^{nd}$ Pass on SPR | $1^{st}$ Pass on SPR | $2^{nd}$ Pass on SPR |
| Black Liquor Flow (gpm) | 1.8 | 1.8 | 2.2 | 2.2 |
| Oxygen Flow (scfm) | 3.0 | 2.7 | 4.0 | 3.8 |
| T inlet ° C. | 24 | 54 | 24 | 55 |
| T outlet ° C. | 93 | 75 | 98 | 99 |

EXAMPLE 2

Carbonation and Acidification at 115° C.

The two-liter reactor was charged with 1450 grams of Black Liquor A. Agitation was set at 60 rpm, temperature was increased to 115° C., and carbon dioxide was added to maintain pressure of 150 psig for 180 minutes. Agitation was ceased and the reaction mix was allowed to settle for one hour. The supernatant phase was removed. The agitator was restarted at a rate of 180 rpm. The carbonated liquid-lignin phase was acidified with 8.7M acetic acid to a pH of 3.6. The acidified supernatant phase was collected, and the acidified dense phase was removed and allowed to reach ambient temperature. The ash content of the acidified lignin product was 7.5%.

EXAMPLE 3

Carbonation and Acidification at 115° C.

The two-liter reactor was charged with 1450 grams of Black Liquor A. Agitation was set at 60 rpm, temperature was increased to 115° C., and carbon dioxide was added to maintain pressure of 150 psig for 180 minutes. Agitation was ceased and the reaction mix was allowed to settle for one hour. The supernatant phase was removed. The agitator was restarted at a rate of 180 rpm. The carbonated liquid-lignin phase was acidified with 1.3 liters of 3.5 M acetic acid. The agitation was stopped and the sample allowed to stand for 30 minutes. The supernatant phase was removed. The liquid-lignin phase was acidified again with 1.3 liters of 3.5 M acetic acid, with agitation and then allowed to settle for 30 minutes. The acidified supernatant phase was collected, and the acidified dense phase was removed and allowed to reach ambient temperature. The ash content of the acidified lignin product was 4.2%.

EXAMPLE 4

Carbonation, Acidification, and Water Wash

The two-liter reactor was charged with 1450 grams of Black Liquor A. Agitation was set at 60 rpm, temperature was increased to 115° C., and carbon dioxide was added to maintain pressure of 150 psig for 180 minutes. Agitation was ceased and the reaction mix was allowed to settle for one hour. The supernatant phase was removed. The agitator was restarted at a rate of 180 rpm and the carbonated liquid-lignin phase was acidified with 1.3 liters of 3.5 M acetic acid. The agitation was stopped and allowed to settle for 30 minutes. The acidified supernatant phase was collected. The agitation was re-started and 1 liter of water was added, and the system was mixed for 30 minutes. The agitation was stopped and the system allowed to settle for 30 minutes. The supernatant was collected, and the washed dense phase was removed and allowed to reach ambient temperature. The ash content of the acidified lignin product was 5.2%.

EXAMPLE 5

Carbonation, Acidification, and Water Wash

The two-liter reactor was charged with 1450 grams of Black Liquor A. Agitation was set at 60 rpm, temperature was increased to 115° C., and carbon dioxide was added to maintain pressure of 150 psig for 180 minutes. Agitation was ceased and the reaction mix was allowed to settle for one hour. The supernatant phase was removed. The agitator was restarted at a rate of 180 rpm and the carbonated liquid-lignin phase was acidified with 1.3 liters of 3.5 M acetic acid. The agitation was stopped and allowed to settle for 30 minutes. The acidified supernatant phase was collected. The agitation was re-started and 1 liter of water was added, and the system was mixed for 30 minutes. The agitation was stopped and the system allowed to settle for 30 minutes. The supernatant was collected. The agitator was restarted at a rate of 180 rpm and the carbonated liquid-lignin phase was acidified with 1.3 liters of 3.5 M acetic acid. The agitation was stopped and allowed to settle for 30 minutes. The acidified supernatant phase was collected. The agitation was re-started and 1 liter of water was added, and the system was mixed for 30 minutes. The agitation was stopped and the system allowed to settle for 30 minutes. The supernatant was collected, and the washed dense phase was removed and allowed to reach ambient temperature. The ash content of the acidified lignin product was 1.1%.

EXAMPLE 6

Carbonation, Acidification, and Water Wash of Soda Black Liquor

The two-liter reactor was charged with 2150 grams of Soda Black Liquor. Agitation was set at 60 rpm, temperature was increased to 115° C., and carbon dioxide was added to maintain pressure of 150 psig for 180 minutes. Agitation was ceased and the reaction mix was allowed to settle for one hour. The supernatant phase was removed. The agitator was restarted at a rate of 180 rpm and the carbonated liquid-lignin phase was acidified with 1.3 liters of 3.5 M acetic acid. The agitation was stopped and allowed to settle for 30 minutes. The acidified supernatant phase was collected. The agitation was re-started and 1 liter of water was added, and the system was mixed for 30 minutes. The agitation was stopped and the system allowed to settle for 30 minutes. The supernatant was collected. The agitator was restarted at a rate of 180 rpm and the carbonated liquid-lignin phase was acidified with 1.3 liters of 3.5 M acetic acid. The agitation was stopped and allowed to settle for 30 minutes. The acidified supernatant phase was collected. The agitation was re-started and 1 liter of water was added, and the system was mixed for 30 minutes. The agitation was stopped and the system allowed to settle for 30 minutes. The supernatant was collected, and the washed dense phase was removed and allowed to reach ambient temperature. The ash content of the acidified lignin product was 0.14%.

Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A process for recovering lignin from paper making black liquor comprising:
   (a) carbonizing said black liquor at a temperature between 80° C. and 200° C. and a pressure between about 50 psig and about 200 psig with and about of carbon dioxide to reduce the pH to between 9.0 and 10.5;
   (b) subjecting said carbonated black liquor to a phase separation wherein a dense liquid-lignin phase is formed and a lignin-depleted liquid phase is formed, and NaOH and other basic components are neutralized;
   (c) recovering said lignin-depleted liquid phase;
   (d) removing said dense liquid-lignin phase and neutralized NaOH and other basic components and acidifying said dense liquid-lignin phase with a acetic acid to neutralize residual NaOH and other basic components, thereby generating an acidified granular lignin; and
   (e) recovering lignin from said acidified granular lignin to remove residual acid and ash content, thereby generating purified lignin.

2. The process according to claim 1 wherein said carbonation of said black liquor is carried out by contacting said black liquor with carbon dioxide countercurrently in an amount sufficient to reduce the pH to less than 11.

3. The process according to claim 1 wherein said carbonation of said black liquor is carried out by contacting said black liquor with carbon dioxide countercurrently in an amount sufficient to reduce the pH to between a pH of 9.0 and 10.5.

4. The process according to claim 1 wherein said carbonating step is carried out at a temperature between about 90° C. and 150° C.

5. The process according to claim 1 wherein carbon dioxide from the acidification step is recycled to the carbonizing step.

6. The process according to claim 1 wherein an oxidizing agent is reacted with said black liquor prior to carbonizing in an amount sufficient to eliminate or substantially reduce the odor of the resulting lignin product.

7. The process according to claim 1 wherein an oxidizing agent is reacted with said liquid-lignin phase in an amount sufficient to eliminate or substantially reduce the odor of the resulting lignin product.

8. The process according to claim 1 wherein said non-sulfur containing acid is present in an amount sufficient to reduce the pH to less than pH 4.

9. The process according to claim 1 wherein said non-sulfur containing acid is present in an amount sufficient to reduce the pH to between pH 1.5 and pH 4.

10. The process according to claim 1 wherein said acidifying step is carried out at a temperature up to 200° C. to form granular lignin.

11. The process according to claim 1 wherein said acidifying step is carried out at a temperature from about 80° C. to about 150° C. to form granular lignin.

12. The process according to claim 1 wherein said paper-making black liquor is at a solids content between about 10% and about 70%.

13. The process according to claim 1 wherein said paper-making black liquor is at a solids content between about 30% and about 60%.

14. The process according to claim 1 wherein said black liquor feed from a papermaking operation is removed downstream of a tall oil soap separator.

15. The process according to claim 1 wherein said granular lignin is pelletized.

16. A process for recovering lignin from kraft black liquor at a solids content of between about 30% and 60% comprising:
   (a) pressurizing said kraft black liquor to between 50 psig and 200 psig;
   (b) carbonizing said black liquor to neutralize NaOH and other basic components contained therein at a temperature between about 90° C. and 150° C. in an amount sufficient to reduce the pH to between pH 9 and pH 10.5;
   (c) subjecting said carbonated black liquor to a phase separation wherein a dense liquid-lignin phase is formed and a lignin-depleted liquid phase is formed;
   (d) recovering said lignin-depleted liquid phase;
   (e) removing said dense liquid-lignin phase and neutralized NaOH and other basic components; and
   (f) acidifying said dense liquid-lignin phase with acetic acid in an amount sufficient to reduce the pH to between pH 1.5 and pH 3.5 to neutralize residual NaOH and other basic components, thereby generating an acidified dense-lignin phase;
   (g) recovering lignin from said acidified granular lignin to remove residual acid and ash content;
   (h) washing said granular lignin to remove residual acid and ash content, thereby generating purified lignin.

17. The process according to claim 16 wherein an oxidizing agent is reacted with said black liquor prior to carbonizing in an amount sufficient to eliminate or substantially reduce the odor of the resulting lignin product.

18. The process according to claim 16 wherein an oxidizing agent is reacted with said liquid-lignin phase in an amount sufficient to eliminate or substantially reduce the odor of the resulting lignin product.

* * * * *